United States Patent [19]

Webb et al.

[11] Patent Number: 4,844,496
[45] Date of Patent: Jul. 4, 1989

[54] TRAILER HITCH GUIDE APPARATUS

[76] Inventors: James W. Webb, Rt. 2, Box 2140, Lakeside, Ariz. 85929; Sheldon Webb, Box 1123, Lakeside, Ariz. 85929

[21] Appl. No.: 195,897

[22] Filed: May 19, 1988

[51] Int. Cl.$^4$ .............................................. B60D 1/06
[52] U.S. Cl. .................................... 280/477; 280/511
[58] Field of Search .................. 280/415 A, 475, 477, 280/491 R, 507, 511, 763.1, 491 E, 495, 500, 505, 415 R; 172/272

[56] References Cited

U.S. PATENT DOCUMENTS

| | | | |
|---|---|---|---|
| 3,773,356 | 11/1973 | Eichels | 280/477 |
| 3,879,062 | 4/1975 | Miller | 280/477 |
| 3,944,259 | 3/1976 | Miller | 280/475 |
| 4,226,438 | 10/1980 | Collins | 280/477 |
| 4,417,748 | 11/1983 | Portch | 280/511 |
| 4,657,275 | 4/1987 | Carroll | 280/477 |
| 4,781,394 | 11/1988 | Schwarz et al. | 280/477 |

Primary Examiner—Charles A. Marmor
Assistant Examiner—Richard Camby
Attorney, Agent, or Firm—Leon Gilden

[57] ABSTRACT

A slidably positionable trailer hitch guide apparatus is set forth wherein a trailer hitch guide is formed with a plurality of vertically oriented flanges formed with a connecting plate overlying a slot formed in each vertical flange wherein the slots are aligned with one another and the plate is formed with a "U" shaped recess for accepting a securement ball for use in cooperation with a connecting trailer socket. The vertical flanges each have secured thereto a directing flange formed at an obtuse angle relative to said vertical flange with an underlying connecting flange at an obtuse angle to said plate. A plurality of stabilizing webs are orthogonally and outwardly projectingly secured to each vertical flange for stabilizing the guide apparatus relative to an automotive type bumper having secured thereto the securement ball.

7 Claims, 3 Drawing Sheets

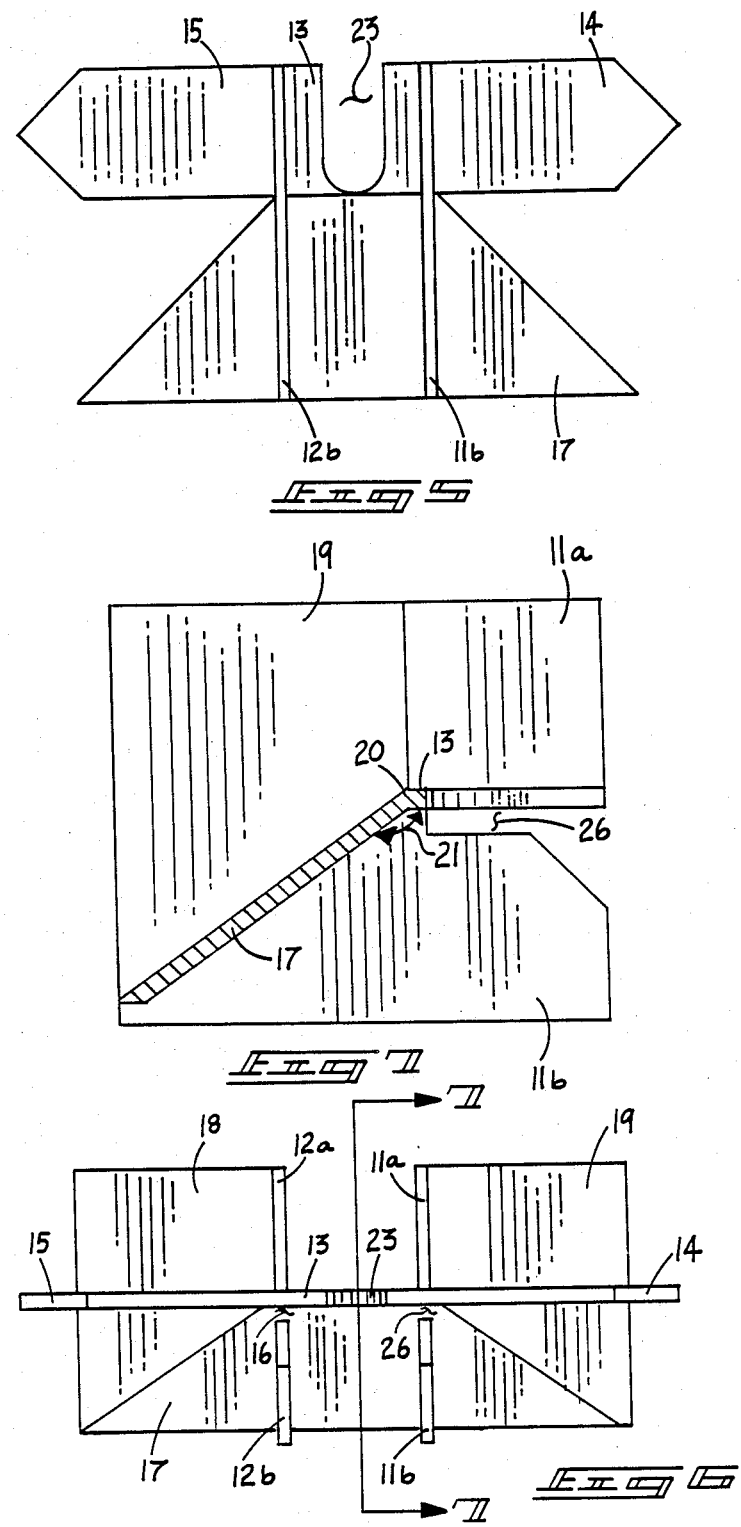

TRAILER HITCH GUIDE APPARATUS

BACKGROUND OF THE INVENTION

1. Field of the Invention

The present invention relates to guiding apparatus for trailer hitches and particularly pertains to a new and improved trailer hitch guide apparatus which may be slipped on to an associated tow vehicle's bumper in use and may thereafter slidably removed after guidance of a trailer socket to an associated towing ball.

2. Description of the Prior Art

The use of guidance means for associating a trailer to a tow vehicle is well known in the prior art. As may be appreciated, these devices have normally required a substantial amount of space and as such it is desirable to remove the devices after they have served their purpose of guiding a trailer tongue onto an associated towing ball. In this connection, there have been several attempts to develop trailer hitch guide apparatus which may be easily and efficiently utilized to associate a trailer tongue to an associated towing or securement ball. For example, U.S. Pat. No. 3,773,356 to Eichels sets forth an arcute plate positionable behind an associated trailer ball located on a towing vehicle wherein the guide is integrally formed to a vertically oriented post that is welded to the towing vehicle's bumper and thereby assists in associating a trailer with a towing vehicle by use of the arcuate guide.

U.S. Pat. No. 3,879,062 to Miller sets forth a guiding apparatus for use with a trailer tongue and a hitch ball wherein an elaborate bracheting arrangement is secured to the associated towing vehicle in an overlying orientation relative to the hitch ball to enable guidance of the trailer to the associated ball, but as in other prior art is integrally secured to the towing vehicle.

U.S. Pat. No. 3,944,259 to Miller sets forth the use of a trailering guide apparatus wherein an arcuate guide is integrally secured to a towing bumper and as in other apparatus of this type as opposed to the instant invention, requires integral securement to the towing vehicle thereby.

U.S. Pat. No. 4,226,438 to Collins is yet another in the series of integrally formed guide apparatus for securement to an associated tow vehicle with an addition to being in constant securement to the tow vehicle is, as in other prior art devices subject to weathering and accordingly requires continuous maintenance, as opposed to the instant invention that is slidingly removable subsequent to use.

U.S. Pat. No. 4,657,275 to Carrol sets forth a relatively elaborate guidance apparatus for use with a hitch-type ball wherein a ramp is pivotally secured to an extension member which is integrally secured to the towing vehicle in surrounding relationship to the hitch-ball. Upstanding walls on the ramp assist in guidance of an associated hitch to the hitch ball that subsequently collapses under the weight of the hitch, but presents a relatively elaborate and complex organization as opposed to the structure of the instant invention.

As such, it may be appreciated that there is a continuing need for a new and improved trailer hitch guide apparatus which addresses both the problem of storage and portability as well as effectiveness, and in this respect, the present invention substantially fulfills this need.

SUMMARY OF THE INVENTION

In view of the foregoing disadvantages inherent in the known types of trailer hitch guide apparatus now present in the prior art, the present invention provides an trailer hitch guide apparatus which utilized a slidably positionable guide in surrounding relationship to a trailer ball that is subsequently removable to the docking event of the trailer and the trailer hitch ball. As such, the general purpose of the present invention, which will be described subsequently in greater detail, is to provide a new and improved trailer hitch guide apparatus which has all the advantages of the prior art trailer hitching guide apparatus and none of the disadvantages.

To attain this, the present invention comprises a plurality of parallel vertically oriented flanges formed with horizontally aligned slots and with outwardly projecting stabilizing flanges for acceptance of a towing vehicel's bumper within the slots and subsequent stabilizing by the projecting flanges wherein a connecting plate is formed with a "U" shaped recess for acceptance of a trailer hitch ball wherein the recess is of a width less than that of the trailer hitch ball to prevent dislodging of same during use. A downwardly extending guide ramp is formed integrally to the plate and upstanding flanges with a plurality of guide flanges integrally formed to the ramp at its outer terminal edges and obliquely secured to the unstanding flange. Reinforcing ribs are secured to the undersurface of the plate and ramp for effecting stability to the organization.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer hitch guide apparatus which has all the advantages of the prior art trailer hitch guide apparatus and none of the disadvantages.

It is another object of the present invention to provide a new and improved trailer hitch guide apparatus which may be easily and efficiently manufactured and marketed.

It is a further object of the present invention to provide a new and improved trailer hitch guide apparatus which is of a durable and reliable construction.

An even further object of the present invention is to provide a new and improved trailer hitch guide apparatus which is susceptible of a low cost of manufacture with regard to both materials and labor, and which accordingly is then susceptible of low prices of sale to the consuming public, thereby making such trailer hitch guide apparatus economically available to the buying public.

Still yet another object of the present invention is to provide a new and improved trailer hitch guide apparatus which provides in the apparatuses and methods of the prior art some of the advantages thereof, while simultaneously overcoming some of the disadvantages normally associated therewith.

Still another object of the present invention is to provide a new and improved trailer hitch guide apparatus that is slidably positionable about an associated trailer hitch ball during use and is subsequently removable subsequent to the hitching event.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCIPTION OF THE DRAWINGS

The invention will be better understood and objects other than those set forth above will become apparent when consideration is given to the following detailed description thereof. Such description makes reference to the annexed drawings wherein:

FIG. 5 is a bottom orthographic view of the instant invention.

FIG. 6 is a rear orthographic view taken in elevation of the instant invention.

FIG. 7 is an orthographic view taken along the lines 7—7 of FIG. 6 in the direction indicated by the arrows.

DESCRIPTION OF THE PREFERRED EMBODIMENT

Figure 1:
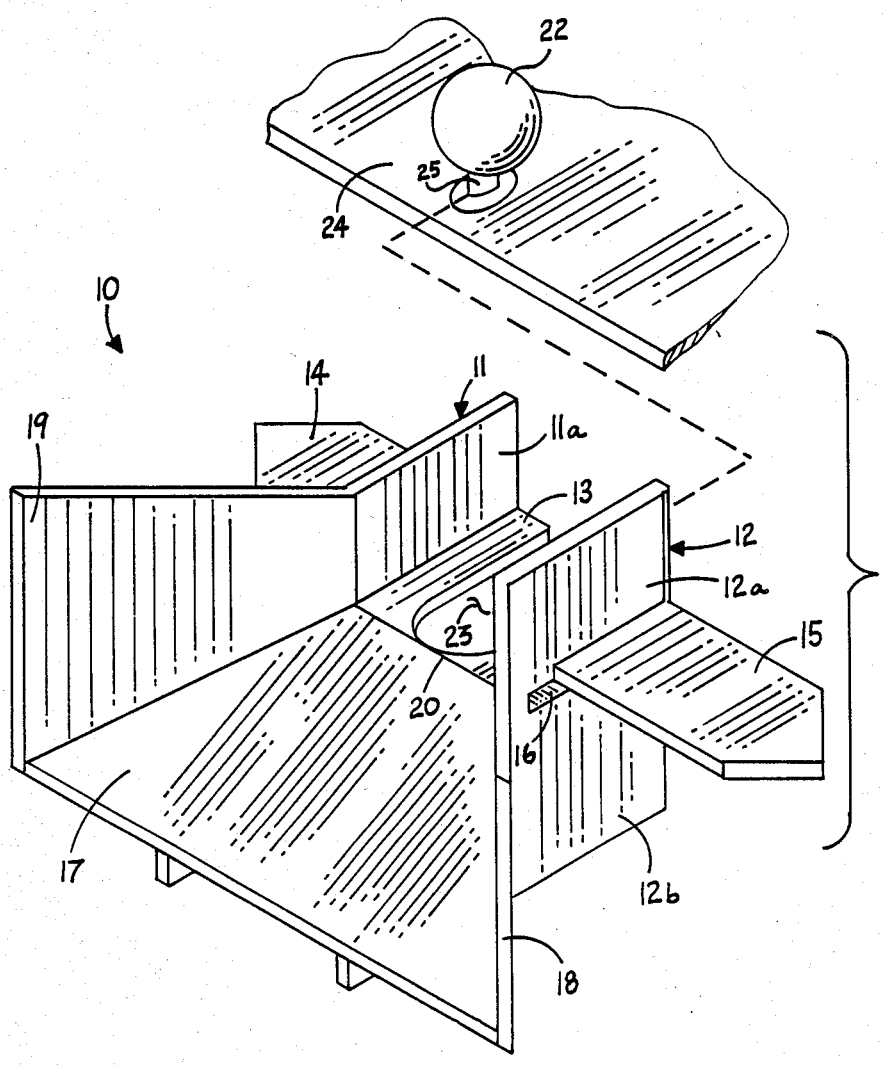
FIG. 1 is an isometric illustration of the instant invention.
Figure 2:
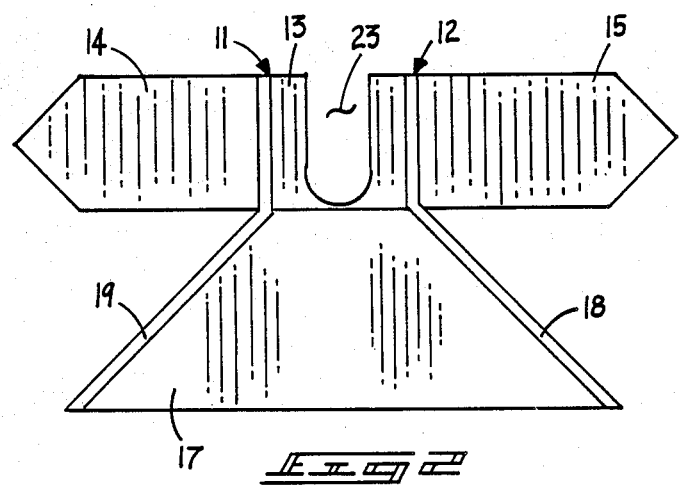
FIG. 2 is a top orthographic view of the instant invention.

With reference now to the drawings, and in particular to FIGS. 1 to 8 thereof, a new and improved trailer hitch guide apparatus embodying the principles and concepts of the present invention and generally designated by the reference numeral 10 will be described.

More specifically, it will be noted that the trailer hitch guide apparatus 10 essentially comprises a first vertical flange 11 parallel and spaced from a second vertical flange 12 with an interconnecting plate 13 formed orthogonally and integrally therebetween. The spaced first and second vertical flanges 11 and 12 respectively have form therein orthogonally from a rear edge thereof a respective first and second slot 26 and 16 respectively, as illustrated in FIG. 7 for example. The interconnecting plate 13 is formed in an overlaying relationship to the first and second slots and is aligned with a first stabilizing web 14 projecting orthogonally and outwardly of the first vertical flange 11 and aligned with a second stabilizing web 15 formed integrally and orthogonally above the first slot 16 and projecting outwardly of the second vertical flange 12.

Figure 3:
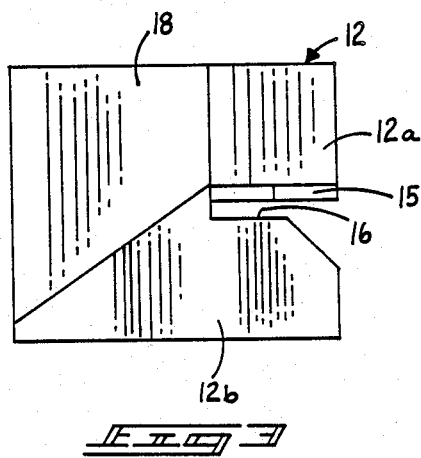
FIG. 3 is a side orthographic view of the instant invention.
Figure 4:
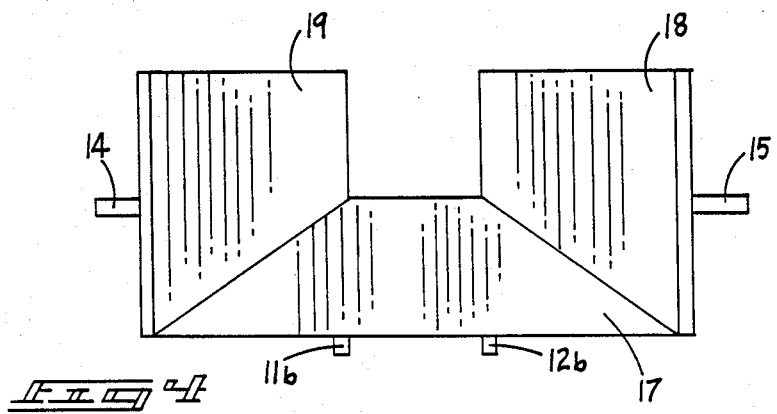
FIG. 4 is a frontal orthographic view taken in elevation of the instant invention.

The respective first and second slots 26 and 16 provide a demarcation for an upper first flange 11a and a lower first flange 11b with the second slot 16 demarcating the orientation of an upper second flange 12a and a lower second flange 12b , as illustrated for example in FIGS. 7 and 8. The respective first lower flange 11b and second flange 12b project forwardly, as illustrated in FIGS. 3 and 8 for example, and support a trapezoidal guide ramp 17 orthogonally secured to the lower flanges 11b and 12b and whose upper edge 20 is contiguously adjoined and integrally formed to a forward edge of the connecting 13. Reference to FIG. 7 illustrates an obtuse included interior angle 21 that has formed within a range of 120 to 150 degrees to provide an accessible ramp angle of the upper parallel surface of the guide ramp 17. Projecting upwardly to the trapezoidal guide ramp 17 are a plurlity of guides comprising a first vertical trapezoidal guide 19 and a second vertical trapezoidal guide 18 respectively the first vertical flange 11 and the second vertical flange 12 along forward edges of the vertical flanges to provide a continuous trough through which a trailer socket and tongue may be directed to unit with an associated hitch ball 22 secured to a conventional flange of a towing vehicle's rear bumper illustrated at 24 in FIG. 1.

The interconnecting plate 13 is formed with a "U" shaped recess 23 directed rearwardly of the interconnecting plate and is of a width less than the diameter of an associated hitch ball 22 wherein the interconnecting plate 13 is received under the hitch ball 22 in surrounding relationship to the connecting stud 25 securing the hitch ball to the rear bumper in a conventional manner. Additionally, the first and second slots 26 and 16 are of a width slightly greater than the bumper flange 24 for the bumper 24 to receive the apparatus 10 to be accepted within the respective first and second wherein the "U" shaped recess is positioned underlying the hitch ball 22 and in surrounding relationship to the stud 25. The outwardly projecting first and second stabilizing webs 14 and 15 respectively stabilize the apparatus on the bumper flange 24 whereupon a trailer hitch socket of conventional construction (not shown) may be guided in a trough defined by the first and second vertical trapezoidal guides 19 and 18 respectively and the interconnecting trapezoidal guide ramp 17 to dock the hitch socket and to the hitch ball 22. After a docking procedure is culminated between an associated trailer and the hitch ball 22, the trailer hitch guide apparatus 10 may be slidingly removed from the bumper flange 24 and stored for subsequent use thereby minimizing exposure to elements and limiting maintenance and bulk of such guides in use with towing vehicles.

The manner of usage and operation of the instant invention therefore should be apparent from the above description, and accordingly no further discussion relative to the manner of usage will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationship to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTER PATENT of the United States is as follows:

1. A trailer hitch guide apparatus for use in combination with a flange bumper of a tow vehicle and for sliding securement to said flange bumper for aligning a trailer tongue to a hitch ball secured to said flange bumper wherein said hitch ball is of a first diameter, said apparatus comprising, a pair of spaced first and second vertical flanges each formed with a slot extending inwardly from respective rear edges of said flanges, and an interconnecting plate formed with a recess orthogonally joined to said respective first and second flanges wherein said recess is of a width less than said hitch ball, and a guide ramp extending downwardly from said plate and integrally formed thereto to form a continuous surface with said plate, and a first and second vertical guide integrally formed to each side of said guide ramp and integrally formed to said respective first and second flanges to define a converging trough to said interconnecting plate.

2. A trailer hitch guide apparatus as set forth in claim 1 wherein a first and second stabilizing web are formed orthogonally and directed outwardly of said respective first and second vertical flanges.

3. A trailer hitch guide apparatus as set forth in claim 2 wherein said first and second stabilizing webs are in alignment with said interconnecting plate and are integrally formed to said first and second vertical flanges above each slot formed in each of said flanges.

4. A trailer hitch guide apparatus as set forth in calim 3 wherein said interconnecting plate is orthogonally formed between said first and second vertical flanges.

5. A trailer hitch guide apparatus as set forth in claim 4 wherein said guide ramp is formed of a trapezoidal shape and wherein said first and second vertical guides are each formed of trapezoidal shapes wherein said first and second vertical guides are of equal shapes to provide the converging trough with symmetry.

6. A trailer hitch guide apparatus as set forth in claim 5 wherein said first and second vertical flanges are formed with respective lower flange portions extending along the underside of said guide ramp for re-enforcement of said apparatus.

7. A trailer hitch guide apparatus as set forth in claim 6 wherein said interconnecting plate is formed with an underlying surface at an obtuse angle to an underlying surface of said guide ramp of 120 degrees to 150 degrees.

* * * * *